US007206818B2

(12) United States Patent
Okochi et al.

(10) Patent No.: US 7,206,818 B2
(45) Date of Patent: Apr. 17, 2007

(54) SHARED MEMORY MULTIPROCESSOR SYSTEM

(75) Inventors: Toshio Okochi, Union Lane (GB); Toru Shonai, Kodaira (JP); Naoki Hamanaka, Tokyo (JP); Naohiko Irie, Santa Clara, CA (US); Hideya Akashi, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 568 days.

(21) Appl. No.: 10/632,856

(22) Filed: Aug. 4, 2003

(65) Prior Publication Data

US 2004/0024839 A1    Feb. 5, 2004

Related U.S. Application Data

(63) Continuation of application No. 09/376,007, filed on Aug. 19, 1999, now abandoned.

(30) Foreign Application Priority Data

Aug. 20, 1998   (JP)   ................................ 10-233832

(51) Int. Cl.
    *G06F 15/167*   (2006.01)
(52) U.S. Cl.   ........................ 709/212; 709/215; 709/223
(58) Field of Classification Search ................ 709/212, 709/215, 223
    See application file for complete search history.

(56) References Cited

U.S. PATENT DOCUMENTS 4,539,637 A    9/1985   DeBruler ..................... 709/312

| 4,587,610 A | * | 5/1986 | Rodman | ...................... 711/207 |
|---|---|---|---|---|
| 5,388,242 A | | 2/1995 | Jewett | ......................... 711/113 |
| 5,437,017 A | | 7/1995 | Moore et al. | |
| 5,522,045 A | * | 5/1996 | Sandberg | ..................... 709/215 |
| 5,897,664 A | | 4/1999 | Nesheim et al. | ............ 711/206 |
| 6,145,064 A | | 11/2000 | Long et al. | ................. 711/158 |
| 6,263,403 B1 | | 7/2001 | Traynor | ....................... 711/133 |
| 6,286,092 B1 | | 9/2001 | Frank et al. | ................. 711/207 |
| 6,308,247 B1 | | 10/2001 | Ackerman et al. | .......... 711/206 |

OTHER PUBLICATIONS

"The Stanford FLASH Multiprocessor", the 21$^{st}$ Annual I.S.C.A proceedings, by Jeffrey Kuskin, et al., pp. 302-313.

* cited by examiner

*Primary Examiner*—Patrice Winder
*Assistant Examiner*—Adnan M. Mirza
(74) *Attorney, Agent, or Firm*—Mattingly, Stanger, Malur, Brundidge, P.C.

(57) ABSTRACT

Multiprocessor system, having a translation lookaside buffer (TLB) in each processor, and having a structure for avoiding TLB purge overhead. Each processor node is provided with a partial main memory and a physical page map table (PPT). The PPT stores mapping between physical page number of main memory and virtual page number. Every memory access transaction for other node specifies physical address and virtual page number. Instead of strictly maintaining TLB coherency by broadcasting TLB purge transaction, an access destination node checks the coincidence between the virtual page number specified in the memory access transaction and the virtual page number mapped in the PPT when the transaction is received. If both are coincident, the memory access is executed. If not coincident, an error message is transferred to an access requesting source.

10 Claims, 6 Drawing Sheets

START
↓
INVALIDATE LINE OF PPT CORRESPONDING TO PHYSICAL PAGE — 8001
↓
UPDATE PAGE TABLE — 8002
↓
UPDATE LINE OF PPT VALIDATE — 8003
↓
END

FIG. 9

| PHYSICAL PAGE # | MAP ID | STATUS BIT | MAP ID | STATUS BIT |
|---|---|---|---|---|
| | | | | |
| | | | | |
| | | | | |
| | | | | |
| | | | | |

SHARED MEMORY MULTIPROCESSOR SYSTEM

The present application is a continuation of application Ser. No. 09/376,007, filed Aug. 19, 1999 now abandoned, the contents of which are incorporated herein by reference.

BACKGROUND OF THE INVENTION

The present invention relates to shared memory multiprocessor systems of the type employed as information processing systems, such as a personal computer work station or server, and, more particularly, to a method and system for maintaining memory coherence.

DESCRIPTION OF THE RELATED ART

Various shared memory multiprocessor systems have been proposed, in order to obtain a high throughput.

"Evolved System Architecture", Sun World, January 1996, pp 29–32, discloses a multiprocessor system in which a plurality of boards, each having a processor and a main memory, are connected by a crossbar switch. In order to maintain cache coherency, a cache coherent check transaction is broadcasted to all of the processors.

"The Stanford FLASH Multiprocessor", the $21^{st}$ annual I.S.C.A. proceedings, pp 302–313, discloses another system in which cache-coherence protocol is directory-based. Each directory of each data line indicates which processor has a cache holding a copy of the data line. Accordingly, the cache coherent check transaction can be selectively transferred.

In those multiprocessors, an operation system capable of "multitasking" or "multiprocessing" is employed. Each task in a multitasking system has an individual virtual address space. Each virtual address space is projected on a physical address space of the main memory. The operating system manages the projection by using a "page table", which defines the mapping between respective virtual pages and respective physical pages. In the system which uses virtual address spaces, address conversion should take place on every memory access (load/store or instruction fetch). A method using a TLB (Translation Lookaside Buffer) is known to provide high speed address conversion. The TLB is a buffer holding information providing a correspondence between each virtual address and its corresponding physical address generated under a conversion algorithm.

When a TLB is employed in a shared memory multiprocessor system, coherence between each TLB should be maintained. U.S. Pat. No. 5,437,017 discloses a method for maintaining TLB coherency. According to this method, the operating system will broadcast a TLB purge transaction when a page table is updated. TLB coherency can be maintained by invalidating all of the lines of TLBs in all remote processors.

The prior method for maintaining TLB coherency can be analyzed as follows:
(1) The TLB purge transaction should be broadcasted, which causes a burden for the inter-processor network.
(2) The transaction should be transferred inside of each processor, which causes an increase in the traffic on the processor bus and a decrease in the processor throughput.
(3) When a processor receives a TLB purge transaction, the processor should stop executing all memory access transactions before invalidating the TLB line, which causes an interruption of the instruction pipeline and a decrease of the processor throughput.

These problems become particularly serious in multiprocessor systems having a large number of constituent processors.

SUMMARY OF THE INVENTION

It is therefore one object of the present invention to provide a multiprocessor system with a lower overhead on processor throughput.

It is another object of the present invention to provide a method and system for maintaining TLB coherency with less traffic on a network.

It is still a further object of the present invention to provide a method and system for maintaining TLB coherency without broadcasting or with infrequent broadcasting of a TLB purge transaction.

A multiprocessor system according to a feature of the present invention has a plurality of nodes, each including one or more CPUs and a main memory. Each node has a table holding a virtual page number mapped to each physical page of the main memory in the node, on each table entry corresponding to each physical page. The table is called a physical page map table (PPT). When the operating system changes the mapping between virtual pages and physical pages (updates the page table), the operating system will update the physical page map table.

A bus transaction and network transaction for memory access (memory access transaction in general) include a physical address and a virtual page number. When a node receives a memory address transaction, the node checks the coincidence between the virtual page number included in the received memory access transaction and a virtual page number read out from the physical page map table by using the physical address as a key. If both virtual page numbers are coincident, the node will execute the memory access. If they are not coincident, the node informs the access source of this condition using an error message. A mismatch occurs when a transaction source updates its page table at the time a TLB line is changed by the operating system, before the transaction occurs, and the physical page map table is updated.

The processor that issued the error massage will update the TLB line by referring to the page table corresponding to the rejected memory access transaction.

According to this structure, a mismatch between the page table and the TLB is detected by a destination node of a memory access transaction, at the time when the memory access actually occurs. Therefore, a broadcast of a TLB purge transaction to all nodes can be avoided.

DETAILED DESCRIPTION OF THE PREFERRED EMBODIMENTS (First Embodiment)

(1) System Structure

Figure 1:
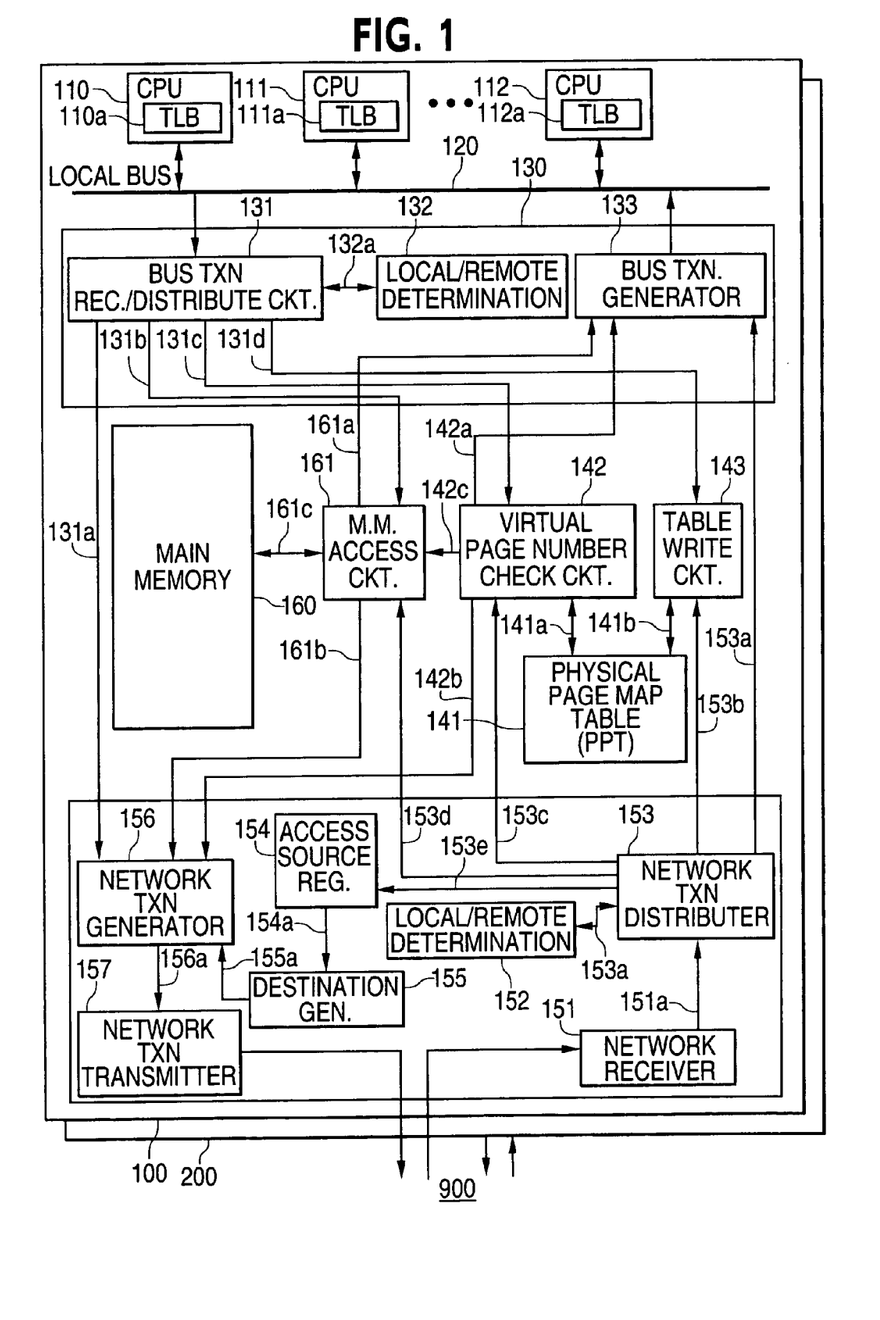
FIG. 1 is a block diagram of a multiprocessor system that represents an embodiment of the present invention.

FIG. 1 shows a shared memory multiprocessor system representing a first embodiment of the present invention. The multiprocessor system includes sixty-four nodes 100, ..., 200 and an inter-node network 900. All nodes have the same structure. Node 100 includes a plurality of CPUs 110, 111, ..., 112 and a main memory 160. Transactions to the node 100 from the network 900 are received by a network transaction receiver 151. Transactions from the node 100 to other nodes are transmitted by a network transaction transmitter 157.

Main memory 160 is a part of a common main memory of the overall system. In other words, the main memory of each node can be used by all of the CPUs within the overall system. That is a basic feature of a shared memory multiprocessor system. CPUs in the node 100 are connected to each other through a local bus 120. However, other types of connections such as one to one connections or switches, can be employed instead of the local bus 120. Main memory access circuit 161 issues a network transaction for cache coherence check (CCC), when a main memory access request is issued from a local CPU, and also issues a main memory access transaction to another node. Further, the main memory access circuit 161 executes a main memory access on the local main memory 160, and also executes CCC transactions and main memory access transactions received from other nodes.

Descriptions of circuits for transmitting transactions are as follows. Within the block 130, the transaction receive and distribute circuit 131 receives bus transactions which have originated in local CPUs and distributes the bus transactions. Local/remote determination circuit 132 determines whether a memory access from a CPU is local or remote. Local means that the destination address of the memory access is located in the main memory 160 of the local node. Remote means that the destination address is located in a main memory of another node. The local/remote determination circuit 132 determines remote or local status by using the physical address of each of the memory access transactions.

Physical page map table 141 stores the numbers of virtual pages actually mapped to physical pages of the local main memory 160. Virtual page number check circuit 142 checks the physical address and virtual page number included in an access transaction to the local main memory 160 with the content of the physical page map table 141, and determines whether the access transaction is valid or not. Table write circuit 143 is a circuit accessed by the operating system for updating the contents of the physical page map table 141.

Network transaction generator 156 generates network transactions, such as a CCC transaction, a remote main memory access transaction, and an acknowledge transaction, to remote nodes. Destination generator 155 determines to which node each transaction should be sent. The circuits 141, 142 and 143 are peculiar to the embodiment. Also, the operation of the destination generator 155 is peculiar to this embodiment.

Figure 2:
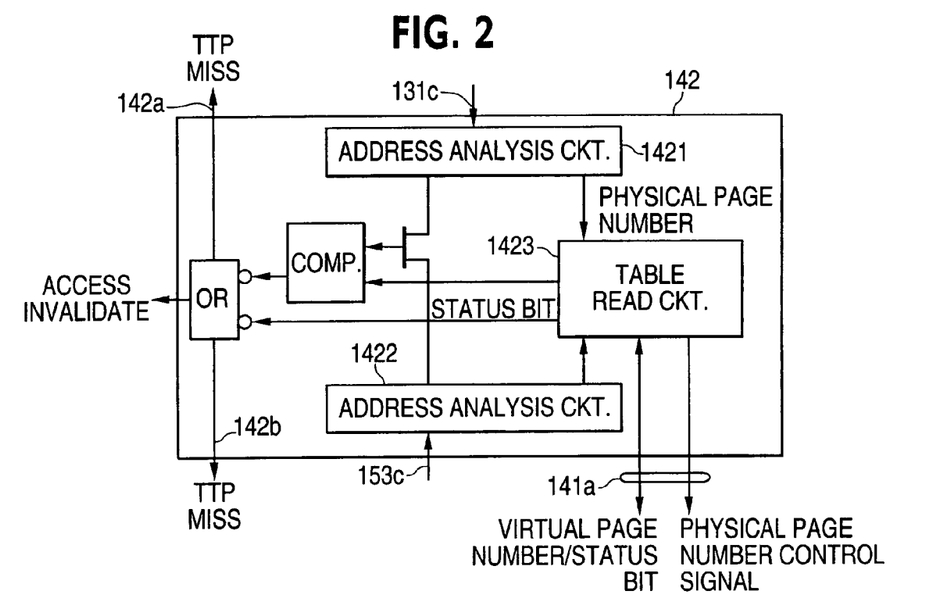
FIG. 2 is a block diagram of a virtual page ID check circuit provided in each node of the embodiment.

FIG. 2 is a block diagram of the virtual page number check circuit 142. Address analysis circuit 1421 extracts a virtual page number from a bus command for memory access and calculates, from the destination address of the bus command, a physical page number to which the destination address belongs. Address analysis circuit 1422 works in the same way as the address analysis circuit 1421, but the subject of the analysis is a network command for memory access. Table read circuit 1423 accesses the physical page map table and reads out a virtual page number and status bit corresponding to a specified physical page number.

Figure 3:
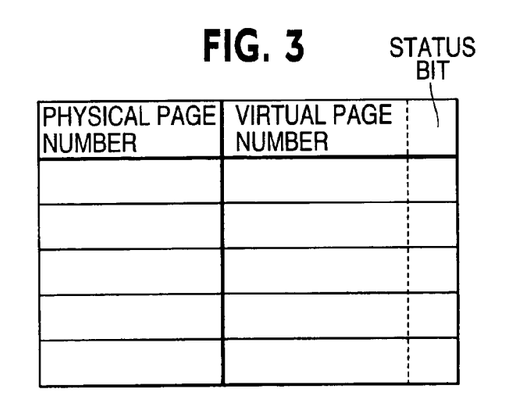
FIG. 3 is a diagram of a physical page map table provided in each node of the embodiment.

FIG. 3 shows the data structure of the physical page map table 141 (PPT), which indicates the correspondence between each physical page number and a virtual page number actually mapped to the physical page number. Further, each entry of the physical page map table has a status bit indicating whether the corresponding page is valid or not. An associative memory can be used as the physical page map table 141.

Now, the descriptions of circuits for receiving transactions are as follows. Network transaction distributor 153 classifies the network transactions sent from another node into transaction species, such as, an acknowledge indicating that a requested memory access is normally executed and an acknowledge indicating the occurrence of a PPT miss in an access destination node. Local/remote determination circuit 152 determines whether the access destination address of a transaction sent from another node is within the node (local), or outside of the node (remote). Bus transaction generator 133 issues a transaction on local bus 120 when, for example, a CCC transaction is received from another node. Main memory access circuit 161 operates to execute a memory access in response to a memory access request sent from each of the remote CPUs via the inter-node network 900 and in response to a memory access from each of the local CPUS. Access source register 154 temporarily stores the node number of the access requesting node when an access transaction is sent from another node. The stored node number is used for determining the destination of an acknowledge to be sent.

(2) Description of Bus Transaction and Network Transaction

Figure 4:
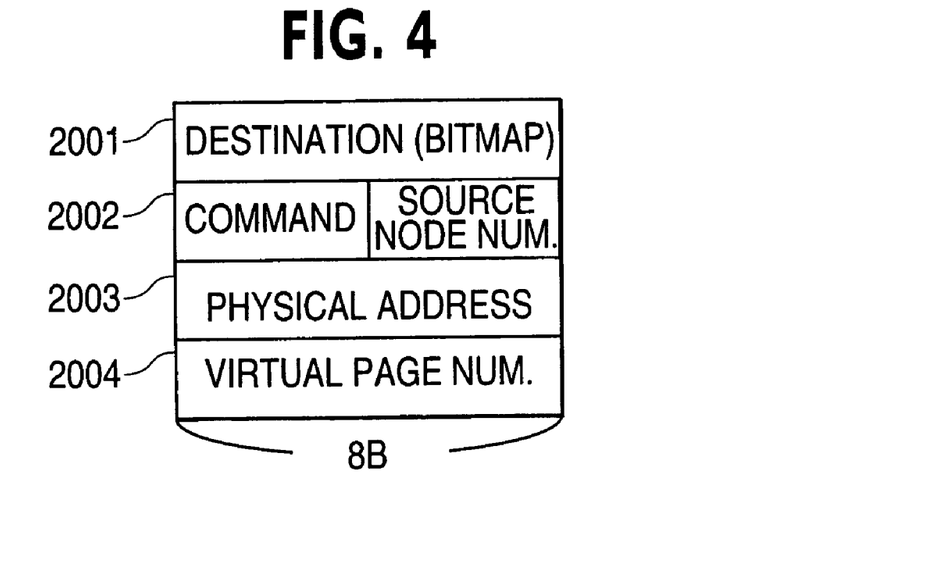
FIG. 4 is a diagram showing the data format of a transaction on a local bus or inter-node network of the embodiment.
Figure 5:
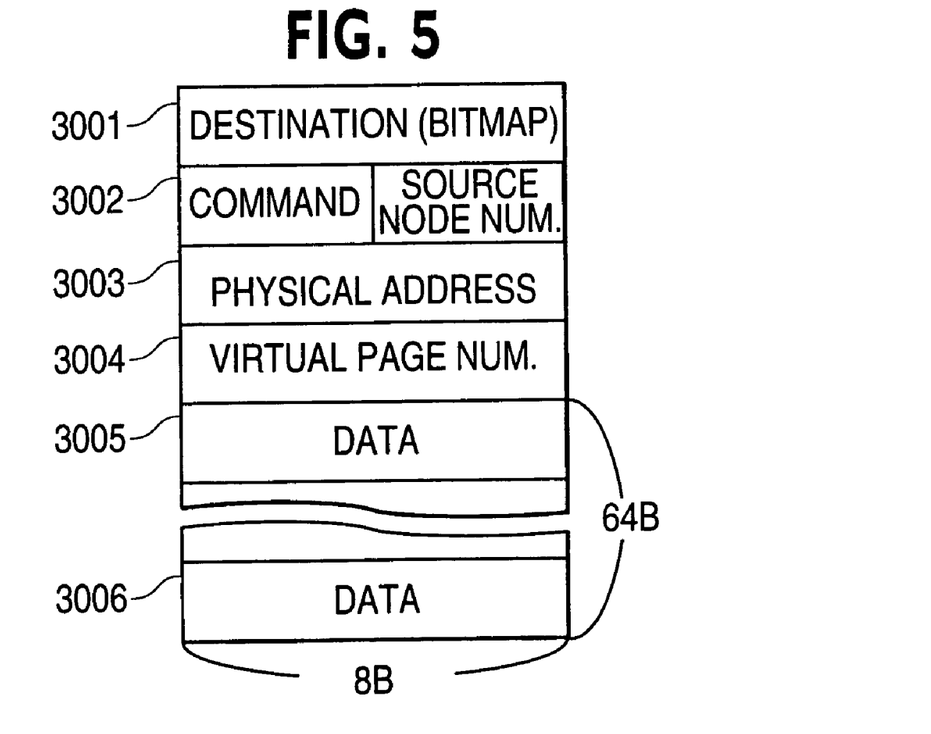
FIG. 5 is a diagram showing the data format of another transaction on a local bus or inter-node network of the embodiment.

FIG. 4 and FIG. 4 and FIG. 5 illustrate the data format of a transaction on a local bus and on the inter-node network, respectively. Respective transactions include a destination designation 2001, 3001, command species and source node number 2002, 3002, physical address 2003, 3003 and virtual page number 2004, 3004. The transaction shown in FIG. 4 is a transaction requesting a data transfer or requesting a cache data invalidation, which does not include data. Transaction shown in FIG. 5 is a transaction requesting writing back of a cache line or the sending of data in response to a data transfer request, which includes data 3005–3006. Maintaining data coherency among processors, cache memories, and partial main memories can be attained by the transactions of those different species.

(3) Operations of a Memory Access Requesting Node

A memory access from a local CPU is issued on the local bus 120 with an access destination physical address. The physical address is obtained by referring to a TLB (Translation Lookaside Buffer) in the local CPU. The bus transaction receive and distribute circuit 131 receives transactions on the local bus 120 and determines the transaction species. When a received transaction is a memory access transaction, the circuit 131 will send the physical address to the local/remote determination circuit 132 via signal line 132a. If the local/remote determination circuit 132 determines that the physical address is in the main memory 160 of the local node, the circuit 131 will send the transaction to the main memory access circuit 161 via signal line 131b and send the transaction to the virtual page number check circuit 142 via signal line 131c. The virtual page number check circuit 142 will read out a virtual page number and condition bit, using the access destination physical address of the transaction, from the physical page map table (PPT) 141 shown in FIG. 3 Then, the circuit 142 will check the read out virtual page number to determine whether it is coincident with the virtual page number address of the transaction or not. If the read-out virtual page number is coincident with the virtual page number address of the transaction and the condition bit indicates "valid", the circuit 142 will inform the main memory access circuit 161 of a "PPT hit", which means that the memory access transaction is valid. The main memory access circuit 161 executes the memory access corresponding to the memory access transaction, when a "PPT hit" is indicated. According to the status of the memory line to be accessed or to the transaction species, the procedure includes a read or write access at main memory 160 and the issue of a network transaction for maintaining cache coherency.

In case the read out virtual page number is not coincident with the virtual page number of the memory access transaction, or if the status bit indicates "invalid", the circuit 142 informs the bus transaction generator 133 of a "PPT miss". Then, the bus transaction generator 133 issues a bus transaction to the local bus 120 to inform the access requesting CPU of this condition using an error message.

If the local/remote determination circuit 132 determines that the access destination is a remote main memory in another node, the bus command receive and distribution circuit 131 transmits the received memory access to the network transaction generator 156 through signal line 131a. The network transaction generator 156 issues a network transaction corresponding to the memory access. Network transaction transmitter 157 then transmits the network transaction to the inter-node network 900.

Network transaction receiver 151 waits for an acknowledge sent through the inter-node network 900. If an acknowledge indicating that the memory access has been normally executed is received, network transaction distributor 153 distributes the acknowledge to the bus transaction generator 133. The bus transaction generator 133 then issues a bus transaction to inform the memory access requesting CPU of receipt of the acknowledge. If an acknowledge indicating that a PPT miss has occurred in the access destination node is received, the bus transaction generator 133 issues a bus transaction for requesting interruption on the local bus 120 to indicate the occurrence of an error. The memory access requesting CPU then generates an interruption and starts a PPT miss handling routine.

Figure 6:
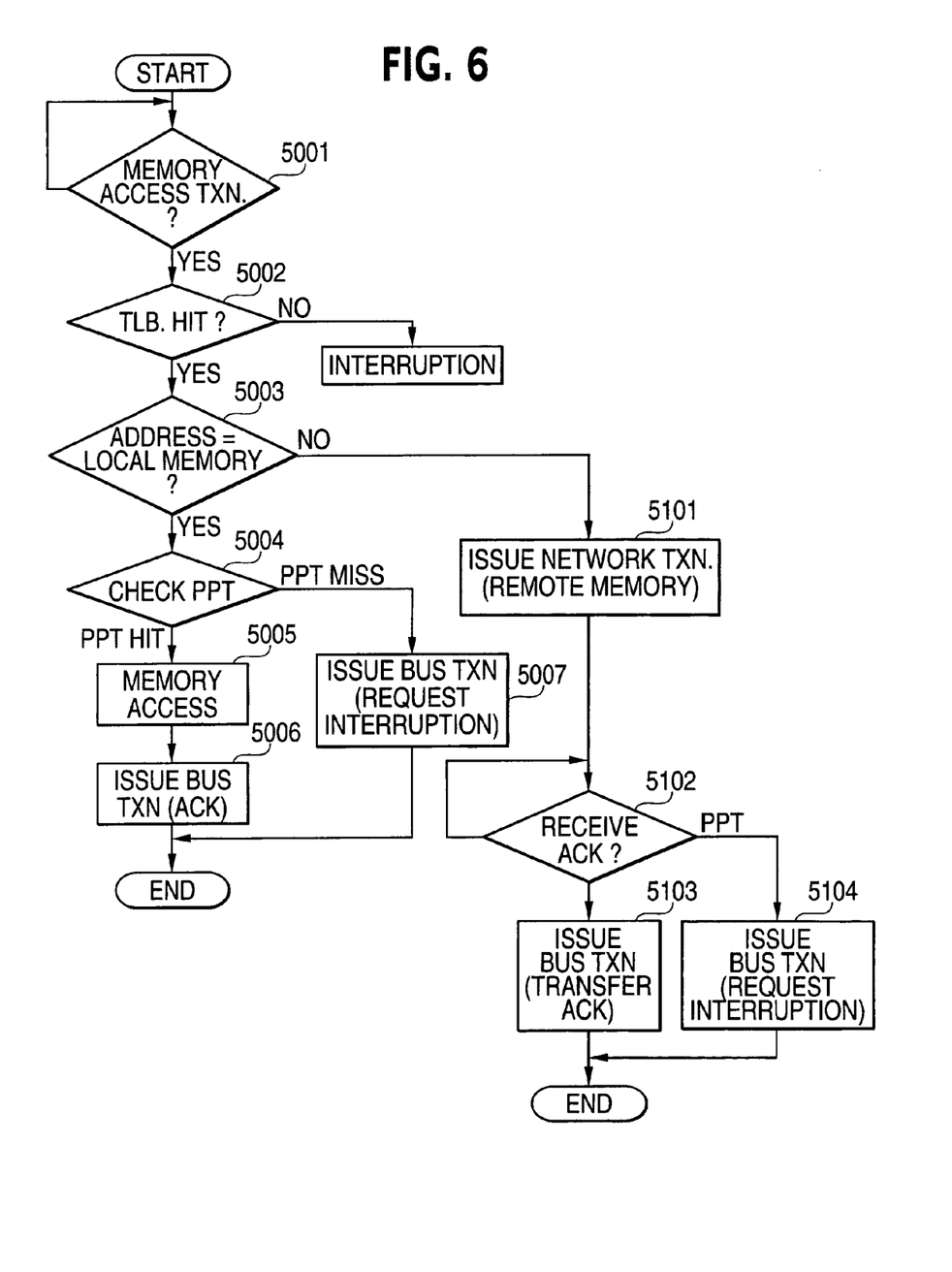
FIG. 6 is a flow diagram showing the procedure carried out in a source node in the case of a memory access request according to the embodiment.

FIG. 6 shows the procedure carried out in a memory access requesting node. The node determines whether the issued transaction is a memory access transaction or not (step 5001). If the transaction is a memory access transaction, reference is made to the TLB (step 5002). If the TLB hits, the virtual address of the memory access request is transformed into a physical address. Then, it is determined whether the physical address is local or remote (step 5003). If the physical address is local, the PPT is checked (step 5004) If a PPT hit is found, the local main memory is accessed (step 5005). Then, a transaction acknowledging the success of the memory access is issued on a local bus (step 5006). If a PPT miss occurs, a transaction requesting an interruption is issued on the local bus (step 5007). If the physical address is found to be remote in the step 5003, a network transaction to access another node is issued (step 5101), and the node waits for an acknowledge (step 5102). If an acknowledge indicating the success of the memory access is received, the acknowledge is transferred to the local bus (step 5103). If an acknowledge indicating a PPT miss is received, a transaction requesting an interruption is issued on the local bus (step 5104).

(4) Procedure in Response to Memory Access from Another Node

Network transaction receiver 151 receives each transaction on the inter-node network 900 and transfers it to the network transaction distributor 153, if the transaction is to be treated in the local node. If the transferred transaction is a memory access transaction, the network transaction distributor 153 sends the access destination physical address to the local/remote determination circuit 152. The local/remote determination circuit 152 determines whether the physical address is in the local main memory 160 or not. If the physical address is in the local main memory 160, the network transaction distributor 153 distributes the memory access transaction to the main memory access circuit 161 through signal line 153d and to the virtual page number check circuit 142 through signal line 153c. The main memory access circuit 161 and the virtual page number check circuit 142 operate just the same as the case where a memory access has originated in a local CPU.

When the memory access transaction is a main memory read request, the main memory access circuit 161 transfers the read-out line data to the network transaction generator 156. The network transaction generator 156 composes a network transaction to be sent back to an access requesting node. The network transaction to be sent back includes the read-out line data and destination address which is generated in the destination generator 155 using the node number stored in the access source register 154. Network transaction transmitter 157 transmits the transaction to the inter-node network 900.

In the case where the read-out virtual page number is not coincident with the virtual page number of the memory access transaction, or if the status bit indicates "invalid", the virtual page number check circuit 142 will inform the network transaction generator 156 of a "PPT miss". Then, the network transaction generator 156 issues a network transaction to send an error message to the access requesting CPU in another node.

Figure 7:
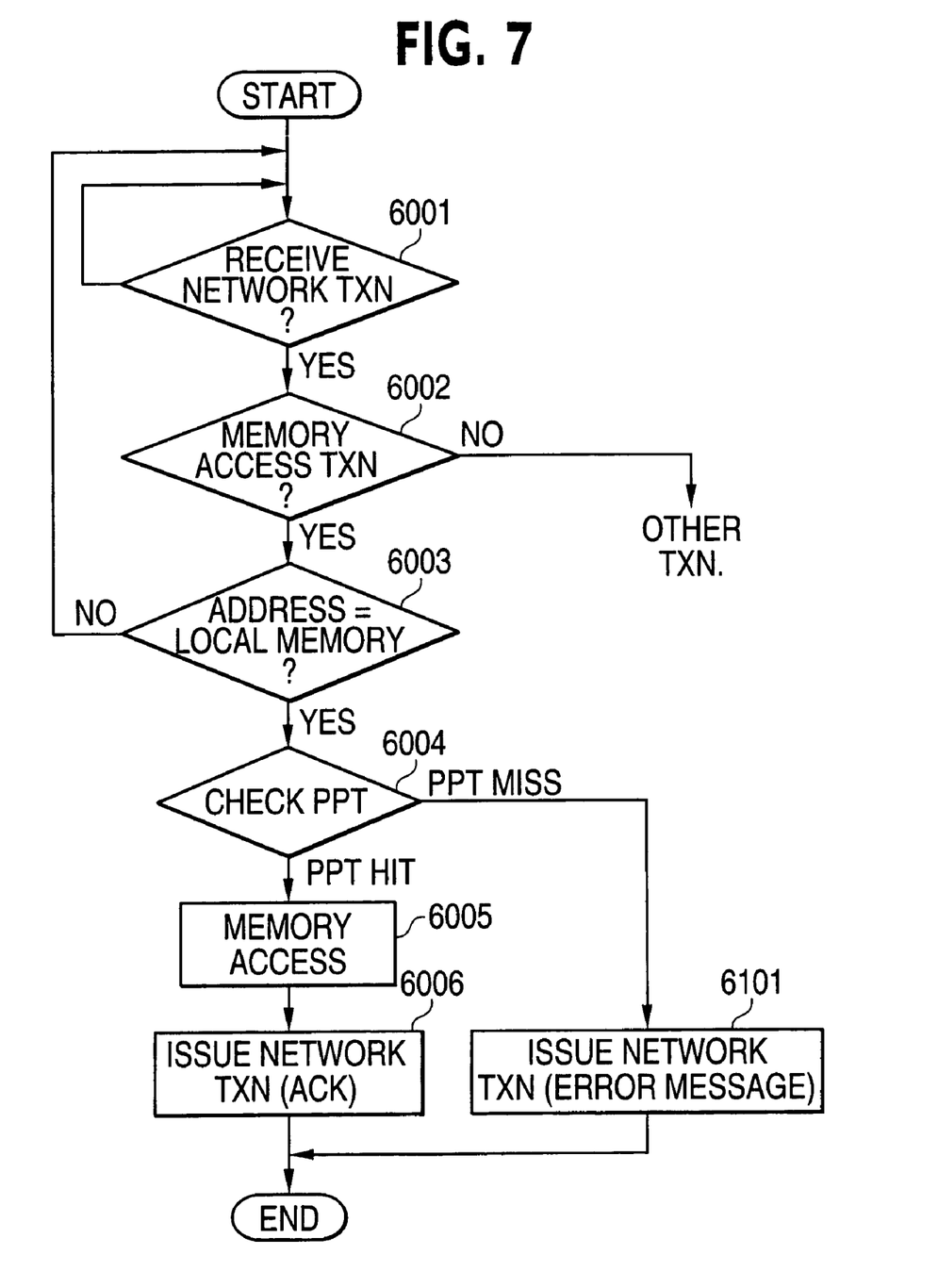
FIG. 7 is a flow diagram showing the procedure carried out in a destination node in the case of a memory access request according to the embodiment.

FIG. 7 shows the procedure which is carried out in response to a memory access received from another node. When a network transaction is received by a node (step 6001), the node determines whether the transaction is a memory access transaction or not (step 6002). If the transaction is a memory access transaction, it is determined whether the access destination address is local or remote (step 6003). If the access destination address is local, the PPT is checked (step 6004) If a PPT hit occurs found, the local main memory is accessed (step 6005). Then, a network transaction acknowledging the success of the memory access is issued (step 6006). If a PPT miss occurs, a network transaction requesting an interruption is issued (step 6101).

(5) Procedure for Updating a Page Table

Figure 8:
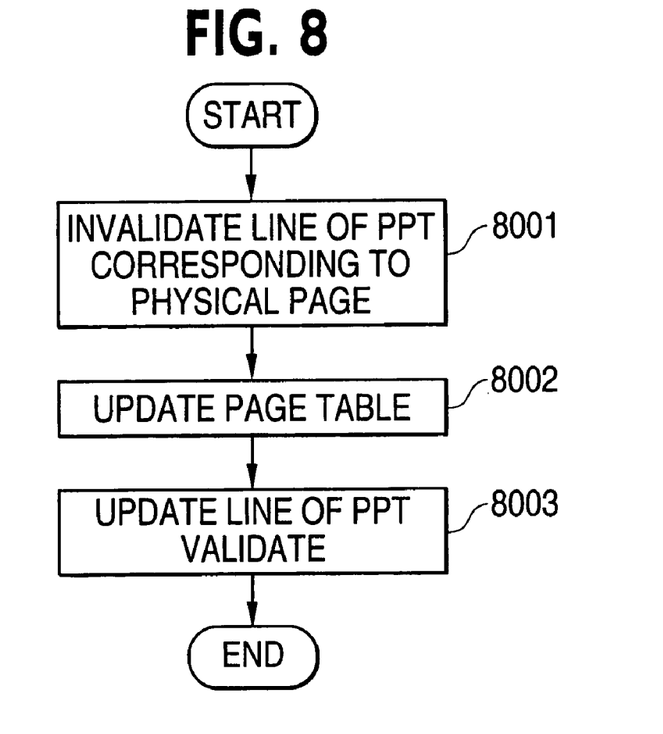
FIG. 8 is a flow diagram showing an example of the procedure carried out in a processor of the embodiment.

FIG. 8 shows the procedure performed by the operation system for updating a page table. At first, the operation system invalidate a line of the physical page map table 141, which corresponds to a physical page of a page table entry to be updated (step 8001). Then, the page table is updated, and a new virtual page is mapped to the physical page (step 8002). Next, the virtual page number newly mapped is written into the physical page map table 141, and the line is validated (8003). If the physical page should be released and listed in a free list, the line of the physical page map table 141 is not validated.

(6) Procedure Performed by an Access Transaction Source when a PPT Miss Occurs.

When a PPT miss is detected in reference to a memory access for a main memory in the local node or a memory access for a main memory of another node, the access requesting CPU is informed of a software interruption by a bus transaction. The procedure of the CPU is interrupted and an interruption routine starts. The interruption routine is similar to the known procedure which is carried out when a TLB miss occurs. Namely, the TLB is updated by referring to the newest page table, and then, the memory access is retried. If the virtual page is not mapped on the page table, a procedure that is similar to the process for a page fault is taken.

The embodiment attains high consistency of memory access among the nodes. Also, the embodiment exhibits low traffic on the inter-node network and on the local bus, in comparison with a prior system in which a TLB purge transaction is broadcasted when a page table is updated.

(Modifications)

(1) The physical page map table shown in FIG. 3 can be modified to store virtual pages corresponding only to partial physical pages. In order to maintain the coherency of the TLB, it may be necessary to broadcast a TLB purge transaction when the page table is updated, for not-stored virtual pages. The entries of the partial physical page map table can be fixed entries. Also, the entries can be dynamically changed with software.

(2) The embodiment is a NUMA (Non Uniform Memory Access) type multiprocessor. The invention can also be applied to multiprocessors of the cc-NUMA type.

(3) According to the embodiment described above, a TLB coherence check is not executed at the time when a page table is updated. Instead of that, in the embodiment, the correctness of an address conversion is checked by referring to the physical page map table in the memory access destination node, at the time when the memory access transaction is issued. That structure of the embodiment can be modified to a structure that partially employs a TLB coherence check at the time when the page table is updated. An example of the modified structure includes means for selectively issuing a TLB purge transaction. Inside of the node, a TLB purge transaction is issued at the time when a page table is updated and a TLB line corresponding to the updated page table is invalidated. A check of the physical page map table is performed only for a memory access transaction from another node.

(4) The physical page map table shown in FIG. 3 has a structure wherein only one virtual page number can be stored for each physical page number. As a modification, a physical page map table may have a structure wherein a plurality of virtual page numbers can be stored for each physical page number. It is also possible to employ a plurality of physical page map tables of the type shown FIG. 3 for one node.

(5) According to the embodiment described above, the correctness of memory access is checked by a coincidence check between the physical page number mapped in the physical page map table and the physical page number of a bus transaction. The object of the coincidence check can be changed to a generation number of mapping, between virtual pages and physical pages (map ID), managed on a page table.

Figure 9:
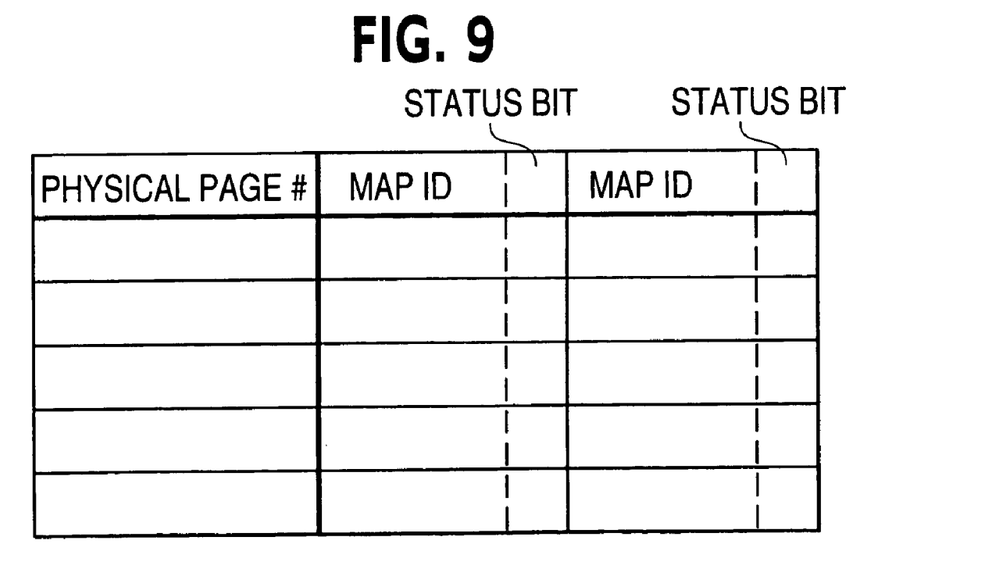
FIG. 9 is a diagram showing a modified structure of a physical page map table to be employed in the embodiment.

According to another modified structure, a map ID is incremented every time a page entry corresponding to the physical page is updated. A table corresponding to the physical page map table 141 stores the map ID. A memory access transaction includes a pair of physical addresses and a map ID. A node having a physical address specified by an issued memory access transaction checks the coincidence between the map ID stored in the table and the map ID specified in the issued transaction. FIG. 9 shows an example of the data format of the modified physical page map table. In a method using a map ID, a PPT miss is incorrectly detected when a virtual page is mapped, after pageout, to the same page. The modified physical page map table shown in FIG. 9 has a structure that can store a plurality of valid map IDs, to reduce the frequency of PPT miss.

(6) The embodiment can be modified to manage a condition bit indicating validity as to a pair of a physical page number and a virtual page number. If a table stores validity information corresponding to all possible pairs, the hardware size and number of signal lines become large. It is preferable to employ an associative memory structure for the physical page map table.

What is claimed is:

1. A multiprocessor system having a plurality of nodes, each node including at least one CPU, at least one Translation Lookaside Buffer (TLB), each associated with a respective Central Processing Unit (CPU), and a local main memory forming a part of a main memory space of the multiprocessor system, and an inter-node network, each of the nodes further comprising:

a map table having entries corresponding to respective physical pages of said local main memory and storing correspondence between each physical page number of said physical pages and a virtual page number actually mapped to each physical page number;

network transaction generating means for generating, when a result of an address translation using a TLB indicates that a memory access request from a CPU is to be directed to a local main memory of another node, a network transaction corresponding to said memory access request which includes a physical address to be accessed obtained from said result of the address translation using the TLB and a virtual page number designated in said memory access request from the CPU;

transaction receiving means for receiving network transactions transferred from other nodes;

checking means for checking for coincidence between a first virtual page number which is included in a received network transaction and a second virtual page number obtained through reference to said map table using a physical address included in the received memory access transaction and outputting a notice indicating whether said first and second virtual page numbers are coincident; and main memory access means for executing an access to said local main memory corresponding to said received network transaction when said notice indicates said first and second virtual page numbers are coincident, wherein when said notice indicates said first and second virtual page numbers are not coincident, an occurrence of an error is informed to the CPU or the CPU of another node if the received network transaction is from said another node.

2. A multiprocessor system according to claim 1, wherein said map table stores a plurality of virtual pages mapped to a physical page.

3. A multiprocessor system according to claim 1, wherein said map table further stores information indicating whether the mapping between a virtual page and a physical page is valid or not.

4. A multiprocessor system according to claim 1, wherein said map table is mapped to a part of a memory space of said multiprocessor system.

5. A multiprocessor system according to claim 1, wherein each node further includes means for selecting physical page numbers in said map table in which a mapped virtual page is stored, among all physical pages of said main memory.

6. A multiprocessor system having a plurality of nodes, each node including at least one Central Processing Unit (CPU) at least one Translation Lookaside Buffer (TLB), each associated with a respective CPU, and a local main memory forming a part of a main memory space of the multiprocessor system, and an inter-node network, each of the nodes further comprising:
a map table having entries corresponding to respective physical pages of said local main memory and storing correspondence between each physical page number of said physical pages and a virtual page number actually mapped to said each physical page number;
network transaction generating means for generating, when a result of an address translation using a TLB indicates that a memory access request from a CPU is to be directed to a local main memory of another node, a network transaction corresponding to said memory access request which includes a physical address to be accessed obtained from said result of the address translation using the TLB and a virtual page number designated in said memory access request from the CPU;
transaction receiving means for receiving network transactions transferred from other nodes;
checking means for checking for coincidence between a first virtual page number which is included in a received network transaction and a second virtual page number obtained through reference to said map table using a physical address included in the received memory access transaction and outputting a notice indicating whether said first and second virtual page numbers are coincident;
main memory access means for executing an access to said local main memory corresponding to said received network transaction when said notice indicates said first and second virtual page numbers are coincident; and
error message generating means for informing a source of said received network transaction of an error when said first and second virtual pages are not coincident,
wherein when said notice indicates said first and second virtual page numbers are not coincident, the occurrence of an error is informed to the CPU or the CPU of another node if the received network transaction is from said another node.

7. A multiprocessor system according to claim 6, wherein said map table stores a plurality of virtual pages mapped to a physical page.

8. A multiprocessor system according to claim 6, wherein said map table further stores information indicating whether the mapping between a virtual page and a physical page is valid or not.

9. A multiprocessor system according to claim 6, wherein said map table is mapped to a part of a memory space of said multiprocessor system.

10. A multiprocessor system according to claim 6, wherein each node further includes means for selecting physical page numbers in said map table in which a mapped virtual page is stored, among all physical pages of said main memory.

* * * * *